May 19, 1931. H. C. BROOKS 1,805,565
CABINET FOR STORING AND PRESERVING FRUITS AND VEGETABLES
Filed Aug. 13, 1929 2 Sheets-Sheet 1

Inventor
H. C. Brooks
By Jacobi & Jacobi
Attorneys

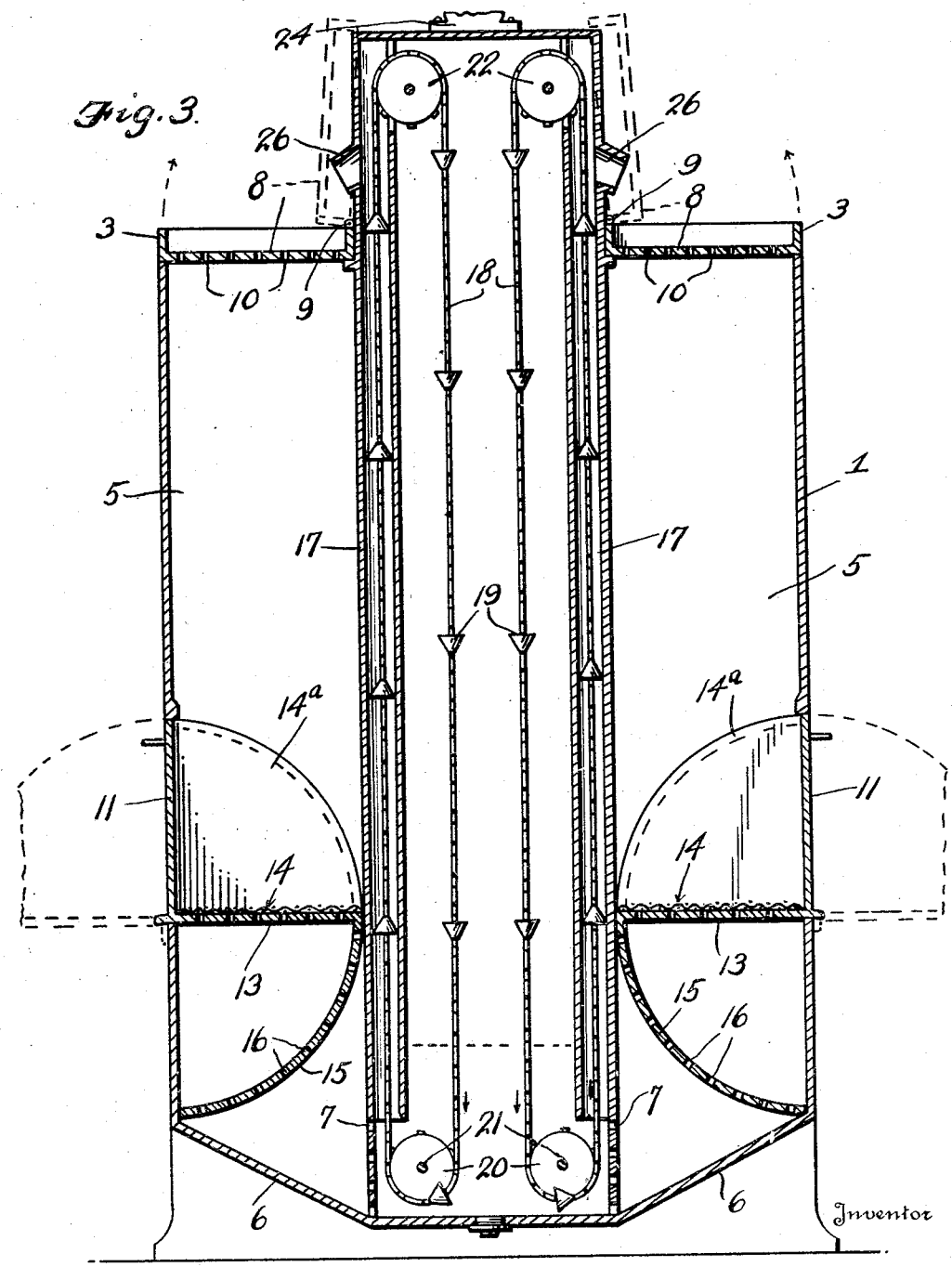

Patented May 19, 1931

1,805,565

UNITED STATES PATENT OFFICE

HARRY C. BROOKS, OF WASHINGTON, DISTRICT OF COLUMBIA

CABINET FOR STORING AND PRESERVING FRUITS AND VEGETABLES

Application filed August 13, 1929. Serial No. 385,623.

My invention relates to new and useful improvements in apparatus for preserving fruits and vegetables on display and the primary object of the invention resides in a water circulating system for preserving fruits and vegetables while on display in shops and the like.

A further object of the invention resides in providing a device provided with bins or the like affording compartments for the reception of various fruits and vegetables through which water may be passed constantly to retain the fruits and vegetables in a fresh condition.

A still further object resides in providing an improved means for removing the vegetables or fruit from the respective bins.

Still another object of my invention resides in providing a device which is provided with means for constantly circulating water through the apparatus for retaining the fruits and vegetables in a fresh and preserved condition.

A still further object resides in providing a device which is comparatively simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawings, forming a part of this application,

Figure 3 is a vertical transverse section therethrough as seen on the line 3—3 of Figure 2.

Figure 2:
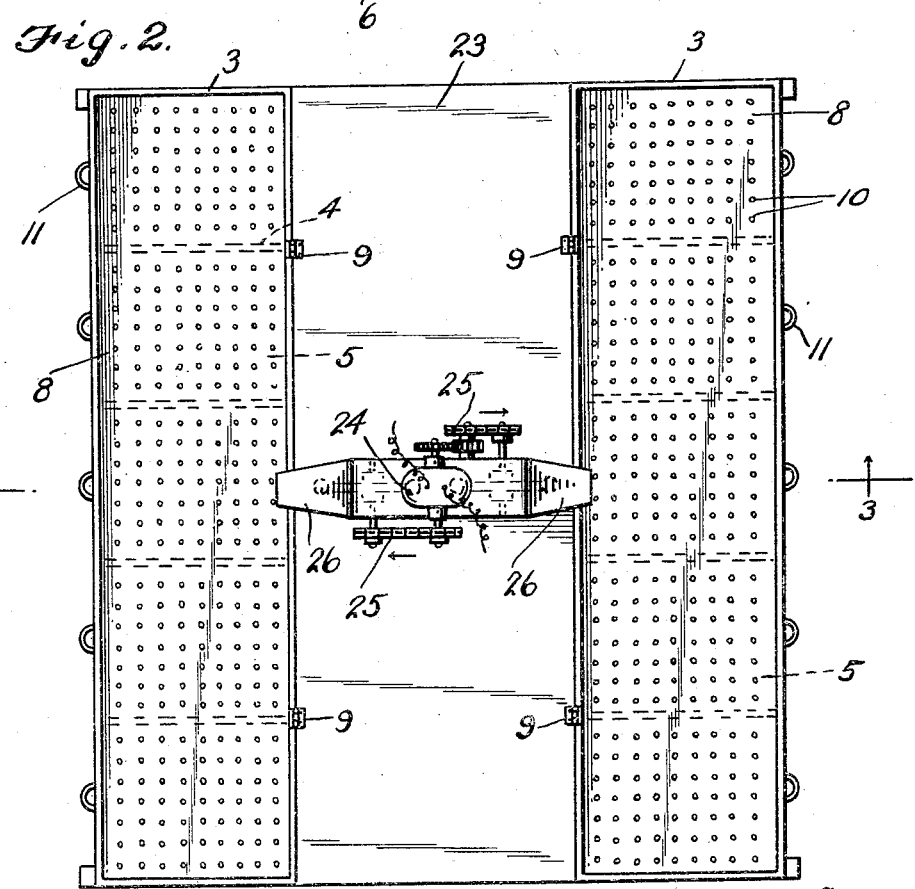
Figure 2 is a plan view thereof on an enlarged scale.
Figure 4:
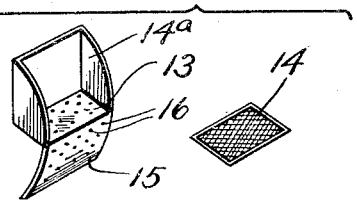
Figure 4 is a perspective view of one of the trays removed.

In describing the invention, I shall refer to the drawings in which similar reference characters designate corresponding parts throughout the several views and in which 1 designates a frame or housing having a central compartment 2 and end or side compartments 3. The side compartments are divided vertically by means of the vertical partitions 4 into a plurality of vertical bins or the like 5, which have sloping bottoms 6 leading towards inner walls which are perforated as shown at 7 so that any liquid matter in the bottom of the bins may flow to the bottom of the central compartment 2, as clearly shown in Figure 3 of the drawings. The end or side compartments 3 which are divided into the bins 5 have hinged covers 8 thereon which are hinged to the walls forming the central compartment 2, as clearly shown in Figures 2 and 3 of the drawings, the hinges being designated by the numeral 9. These covers or tops 8 are trough-like in construction and are supported on the upper ends of the walls forming the frame 1.

The covers are perforated as shown at 10, so that any liquid applied to these trough-like covers will flow downwardly into the bins 5.

Figure 1:
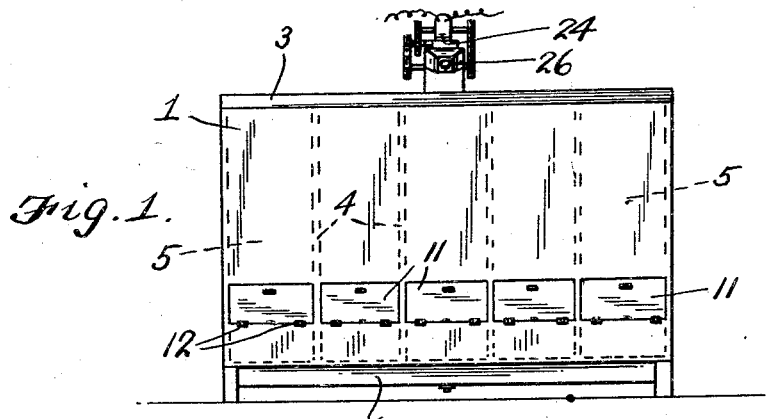
Figure 1 is a front elevation of a device constructed in accordance with my invention.

The outer wall of each bin 5 adjacent the bottom thereof is provided with an opening which has a hinged door 11 covering the same, the hinges being designated by the numeral 12, as clearly shown in Figure 1 of the drawings. These doors 11 are right angular in vertical section, having a tray-like bottom 13 which is perforated and extends across the bin and forms a bottom for the contents of the bin. Side walls 14a are connected with the door 11 and the tray-like bottom 13 so as to retain the contents on said tray-like bottom 13. A removable screen 14 is adapted to be applied to the upper face of the tray-like bottom 13 to collect dirt, dust and other extraneous matter which may be removed from the vegetables or fruit which is supported on this tray-like bottom 13 while being washed or preserved on display.

Formed integral with the outer end of the tray-like bottom 13 is an arcuate depending portion 15 which is also perforated as shown at 16, and when the door 11 is in its closed position, it will be seen that this arcuate portion will collect the water dropping from the tray-like bottom 13 and permit the same to be flowed to the inclined bottom

6 of the bin 5. When the door 11 is disposed to its open position, as shown in dotted lines in Figure 3, articles on the tray portion 13 will be disposed on the inner face of the door 11 in a horizontal position to be collected by the salesman and distributed to the purchaser. At the same time, the arcuate portion 15 disposed in an upward position, will prevent the articles remaining in the bin from dropping to the bottom of said bin below the tray or door 11. Being arcuate in form, the projection 15 will not crush any articles when the door is returned to its vertical position, as shown in full lines in Figure 3.

From the construction above described, it will be seen that various articles may be carried in this cabinet. Of course, only articles of one character will be carried in one bin, but there being a number of bins, fruits and vegetables of various kinds may be displayed within the cabinet.

As stated in the objects of the invention, it is my desire to provide a means for keeping the fruits and vegetables in the various bins in a fresh condition and to preserve the same while ready for sale. To this end, the central compartment 2 is adapted to contain water up to a certain height which may be determined according to the height of the cabinet or apparatus which is used for this purpose. I desire to provide some means for distributing this water over the various articles within the various bins. At this point, I may state that any suitable water distributing means may be used, but for certain purposes I have illustrated what is known as a chain pump for the purpose of distributing this water. Tubes 17 are formed in the chamber 2 adjacent the side walls thereof through which extend the chains 18 carrying the conical flights 19. These flights are of rubber of the usual character and fit snugly within the tubes 17 to carry the water within the lower portion of the compartment 2 up through the tubes, as appears obvious. Sprocket wheels 20 are provided at the bottom of the compartment 2 mounted on shafts 21, over which these chains 18 extend. Additional sprocket wheels 22 are provided at the top of the compartment 2 which top extends above the plane of the tops 8 of the bins.

On the top of the compartment 2 which top is designated by the numeral 23, I prefer to mount a motor 24, which may receive its power from any desired source. If sufficiently small, it may receive its power from the wall socket. A chain and sprocket construction 25 may be used for connecting the motor with the sprocket 22 so that the chains 18 may be caused to operate and carry the water upwardly through the tubes 17. Outward openings 26 are provided in the tubes on a frame above the plane of the top 8 of the bins and spouts are provided thereon to direct the water from these tubes on to the tray-like tops 8. From this, it will be seen that as the water is conveyed upwardly through the tubes 17, the same will be distributed onto the perforated trays or tops 8 from which the water will trickle downwardly through the bins 5 and thus wash the fruits and vegetables and keep the same in fresh and preserved condition. The water dropping from the vegetables and fruits within the bin will pass through the screen 14, through the openings in the tray-like bottom 13 and downwardly to the bottom of the bins from which the same flows into the bottom of the compartment 2, as appears obvious in the construction shown in Figure 3 of the drawings. All dirt and extraneous matter collected on the screen 14 as the water trickles therethrough may be removed by the removal of the screen 14 from the bottom 13. The screen 14 slides in place on the bottom 13 of the door 11, as previously described, and is capable of being readily removed and cleaned when desired.

In stores where fruits and vegetables are sold, considerable difficulty is encountered in retaining the same in fresh and preserved condition. It is a well known fact that so long as water is passed thereover in the manner herein described, the fruits and vegetables will remain fresh and in preserved condition. This apparatus, therefore, not only acts as a device for storing the fruits and vegetables until such time as they may be sold, but also acts as a preserving apparatus therefor.

From the foregoing description of the construction of my improved device, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction, may be resorted to without departing from the spirit or sacrificing any of the principles of the invention.

Having thus described my invention, what I claim is:

1. In an apparatus of the class described, a cabinet divided into a plurality of compartments, said compartments being arranged in series opposed one to the other and providing a central compartment between said series, means for disposing fruits and vegetables in said compartments from the top thereof, means for removing the contents of the compartments adjacent the bottom thereof, and means disposed in the central compartment between the series of compartments for circulating water through said compartments to preserve the contents of the latter.

2. In an apparatus of the class described, a cabinet comprising a plurality of compartments arranged in opposed series, and positioned to provide a central compartment therebetween, perforated top members for said series of compartments, adapted for removal to permit the introduction of fruits and vegetables to said compartments, means adjacent the lower end of said compartments for the removal of the contents thereof, and means operated from the central compartment between the series to circulate water through said tops and through said compartments, as and for the purposes described.

3. In an apparatus of the class described, a cabinet comprising a plurality of compartments arranged side-by-side and disposed in opposed series, hinged top members for said compartments having perforations therein, hinged outlet members adjacent the bottom of said compartments and means intermediate the series of compartments for distributing water over the perforated top members to permit water to circulate through said compartments to preserve the contents of the latter.

4. In an apparatus of the class described, a cabinet composed of a plurality of compartments arranged side by side, means at the top of said compartments for the introduction of food products therein, an outer wall of said cabinet adjacent the bottom thereof having a hinged door, a tray-like projection carried on said door extending within the adjacent compartment and forming a tray to support the contents within said compartment, said tray-like projection having perforations therein and means for circulating water through said compartment to wash and preserve the contents thereof.

5. In a device of the class described, a cabinet comprising a plurality of compartments arranged side by side, top members for said compartments each hinged at one edge thereof and perforated, said top members being of trough-like formation in transverse section, each compartment adjacent its lower end having an outlet opening in the side wall thereof, a hinged door for said outlet opening and provided with an internal projection forming a tray within the compartment, said tray being perforated and means for distributing water to the perforated top members to permit same to circulate through the compartments, as and for the purposes described.

6. In a device of the class described, a cabinet divided into a central compartment and a plurality of compartments arranged on each side of said central compartment, top members hinged to the wall of said central compartment and adapted to close the upper ends of said plurality of compartments, said top members being trough-like in cross section and having their bottom walls perforated, the side wall of each compartment, adjacent the lower end thereof, being provided with an outlet opening, a door hinged to the wall of each compartment to close said outlet opening, each door having an inwardly projecting extension forming a tray-like bottom to receive and support food products within the compartment, said tray-like projection on each door being perforated, and means operated in said central compartment for supplying water to the perforated top members on said compartments to be distributed through said compartments over the contents thereof, as and for the purposes described.

In testimony whereof I affix my signature.

HARRY C. BROOKS.